F. WACKERMANN & C. ZABEL.
ROLL ADJUSTING MECHANISM.
APPLICATION FILED MAR. 3, 1910.
1,020,064.
Patented Mar. 12, 1912.
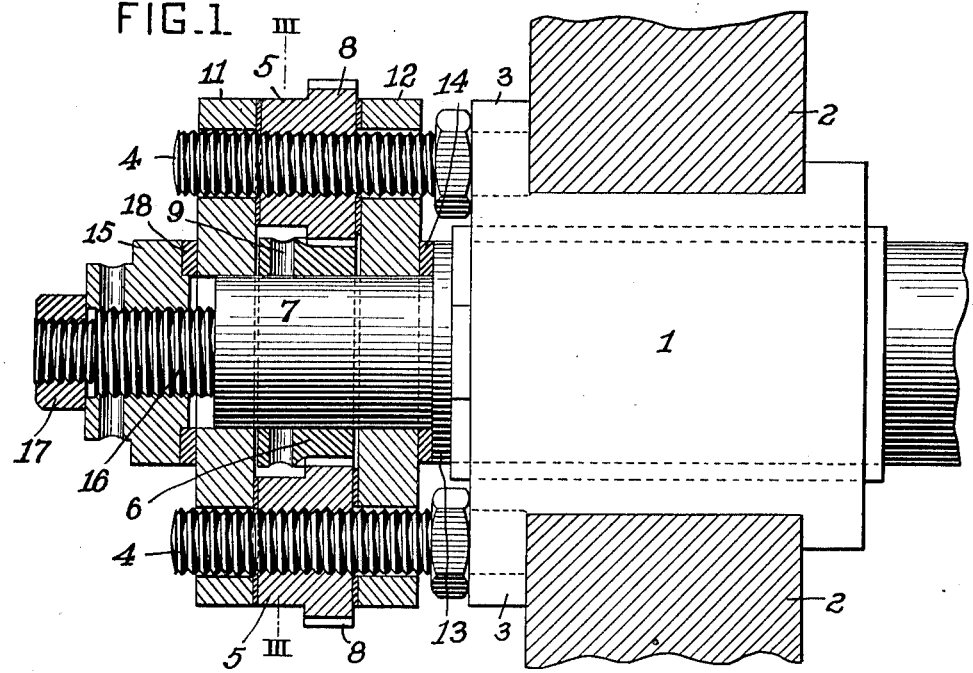
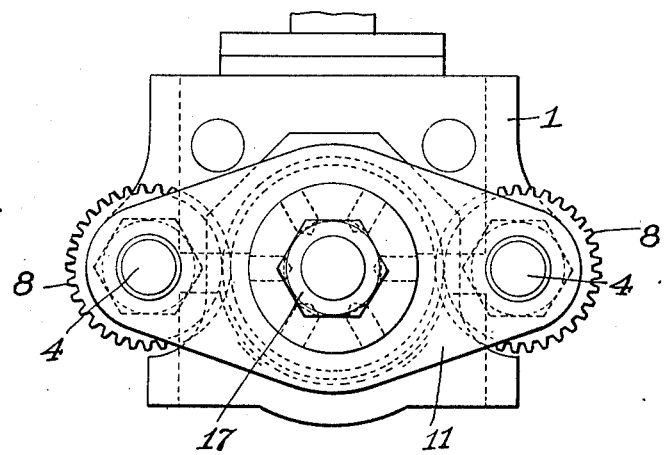
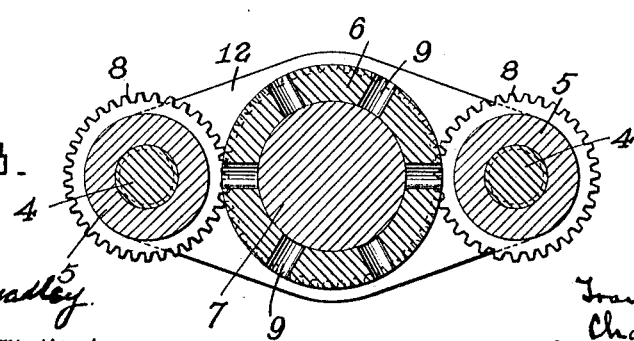
WITNESSES:
INVENTORS

UNITED STATES PATENT OFFICE.

FRANK WACKERMANN, OF CARRICK, AND CHARLES ZABEL, OF PITTSBURGH, PENNSYLVANIA; SAID ZABEL ASSIGNOR TO LEWIS FOUNDRY & MACHINE COMPANY, OF PITTSBURGH, PENNSYLVANIA, A CORPORATION OF PENNSYLVANIA.

ROLL-ADJUSTING MECHANISM.

1,020,064.      Specification of Letters Patent.      Patented Mar. 12, 1912.

Application filed March 3, 1910. Serial No. 547,152.

*To all whom it may concern:*

Be it known that we, FRANK WACKERMANN, residing at Carrick, and CHARLES ZABEL, residing at Pittsburgh, in the county of Allegheny and State of Pennsylvania, citizens of the United States, have invented or discovered certain new and useful Improvements in Roll-Adjusting Mechanism, of which improvement the following is a specification.

The invention described herein relates to certain improvements in means for effecting a longitudinal adjustment of rolls of rolling mills and is hereinafter more fully described and claimed.

In the accompanying drawings forming a part of this specification Figure 1 is a sectional view showing one member or leg of a housing, a journal box for a roll and our improved adjusting mechanism; Fig. 2 is an end elevation of the parts shown in Fig. 1 and Fig. 3 is a sectional view on a plane indicated by the line III—III Fig. 1.

In the practice of our invention the journal box 1 is provided as is customary, with grooves in its sides to receive the edges of the window in the housing 2. The flanges 3 forming the outer wall of these grooves, are extended sufficiently far to permit of the attachment thereto of threaded rods 4 on which are mounted the nuts 5. The threads on both rods are right handed and the said nuts are adapted to be rotated by means of a pinion 6 mounted on an extension 7 of the journal of the roll. This pinion 6 has a portion of its periphery toothed for engagement with the toothed portion 8 of the nuts 5. While the pinion 6 may be rotated by any suitable means it is preferable that radial openings or holes 9 should be formed in its periphery for the reception of capstan bars. A cross head is provided which engages the roll in such manner that the latter will follow the movements of the cross-head imparted thereto by the nuts 5. This cross-head is preferably formed of plates 11 and 12 adapted to slide loosely on the rods 4 and also on the extension 7 and are arranged on opposite sides of the nuts 5. The inner follower plate may bear directly upon the end of the journal 13 of the roll or through the medium of a wearing washer 14 surrounding the extension 7. The outer follower plate is held in position by means of a nut 15 screwing onto a threaded stem 16, on the extension 7 and held in position by lock nut 17. This nut may bear directly upon the follower plate 11 or through a washer 18. As the follower plates 11 and 12, having between them the nuts 5 are held between the end of the journal 13 and the nut 15, any rotation of the nuts 5 by means of the pinion 6 will impart a longitudinal movement to the roll in one or the other direction.

It will be observed that the several parts forming the roll adjusting means are so constructed that when it is desired to change the rolls, all the adjusting mechanism will be carried up when the roll and its journal box 1 are lifted out of the housing. By removing the nut 15 the follower plate 11 and the pinion 6 can be removed and then by screwing off the nuts 5 the other follower plate can also be slipped off permitting the removal of the journal box from the roll.

We claim herein as our invention:

1. The combination with a housing, and a roll rotatably supported therein and provided with an extension, of abutments upon said roll-extension, a cross-head confined between said abutments, and means for shifting the cross-head relatively to the housing.

2. The combination with a housing, and a roll rotatably mounted therein and provided with an extension, of a non-rotatable cross-head adapted to engage said roll-extension, a plurality of threaded rods secured to the housing, nuts engaging said rods and rotatably connected to the cross-head, and means for simultaneously rotating the nuts and thereby moving the cross-head relatively to the housing.

3. The combination with a housing, and a roll rotatably mounted therein and provided with an extension, of abutments upon said roll-extension, plates loosely mounted on the extension between the abutments, a pinion rotatably mounted on the extension between the plates, threaded rods connected to the housing, and nuts mounted on the rods between the plates and provided with teeth engaging the pinion.

In testimony whereof, we have hereunto set our hands.

FRANK WACKERMANN.
CHARLES ZABEL.

Witnesses:
ALICE A. TRILL,
BAYARD H. CHRISTY.

Copies of this patent may be obtained for five cents each, by addressing the "Commissioner of Patents, Washington, D. C."